United States Patent

Thompson

[15] 3,643,110

[45] Feb. 15, 1972

[54] SAMPLE AND HOLD CIRCUIT

[72] Inventor: James E. Thompson, Scottsdale, Ariz.

[73] Assignee: Motorola, Inc., Franklin Park, Ill.

[22] Filed: Nov. 30, 1970

[21] Appl. No.: 93,591

[52] U.S. Cl. ....................307/238, 328/151, 330/30 D
[51] Int. Cl. ....................H03k 17/60
[58] Field of Search ....................328/151; 307/238; 330/30 D

[56] References Cited

UNITED STATES PATENTS

| | | | |
|---|---|---|---|
| 3,158,759 | 11/1964 | Jasper | 328/151 |
| 3,315,089 | 4/1967 | Mayne | 307/238 |
| 3,413,492 | 11/1968 | Schneider | 328/151 |
| 3,309,615 | 3/1967 | Baldwin et al. | 328/151 |
| 3,237,024 | 2/1966 | Mavity | 307/238 |
| 3,541,466 | 11/1970 | Yee | 330/30 D |

*Primary Examiner*—Donald D. Forrer
*Assistant Examiner*—Harold A. Dixon
*Attorney*—Mueller & Aichele

[57] ABSTRACT

There is disclosed a sample and hold circuit employing an amplification stage which is turned ON and OFF by steering a current source between the amplification stage and current sink circuitry. This decreases the aperture time of the sample and hold circuit to such an extent that one microsecond analog to digital conversion is possible for an 8-bit system including sync pulses. The sample and hold circuit eliminates the problem of discharge of the holding capacitor through the sample and hold circuit while at the same time decreasing sample and hold aperture time.

14 Claims, 9 Drawing Figures

INVENTOR.
James E. Thompson
BY
Mueller & Aichele
ATTY'S

INVENTOR.
James E. Thompson
BY
Mueller & Aichele
ATTY'S

INVENTOR.
James E. Thompson
BY
Mueller & Aichele
ATTY'S.

SAMPLE AND HOLD CIRCUIT

BACKGROUND

This invention relates to sample and hold circuits and more particularly to a sample and hold circuit which is switched from a sample mode to a hold mode and back to a sample mode by turning ON and OFF the current sources to an amplification stage coupled to a signal storage stage, such that the amplification stage performs a switching function normally accomplished by reed relays, symmetrical transistors and diode bridges of the prior art.

Current state of the art switches are unavailable to achieve analog to digital conversion in times less than one microsecond. Those switching circuits which do exist either inject an intolerable noise factor or have characteristic aperture times inconsistent with microsecond analog to digital conversion. Prior art devices include reed relays which are several orders of magnitude slower than the subject circuit. In the past symmetrical transistors have been used in sample and hold circuits. These circuits, however, result in intolerable switching noise levels resulting from lack of knowledge of the exact input and output potentials of the transistors. This lack of knowledge makes it impossible to know how to drive the base of these transistors and thus distortion or noise results. Diode bridges have also been used to perform the switching function in sample and hold circuits but they are not generally used because of the noise levels involved.

Another noise problem results from the discharge of the capacitor used in the signal storage stage back through the sample and hold circuit. While field effect transistors (FET's) have been used recently to alleviate capacitor leakage problems they are relatively slow-switching devices. The apertures for current FET's are on the order of hundreds of nanoseconds. This aperture time must be added to the charging and discharging time of the capacitor in order to obtain the total cycle time for the sample and hold circuit. The use of FET's thus results in total cycle time of tens of microseconds which affects the overall speed of analog to digital conversion.

The subject sample and hold circuit not only eliminates the above-mentioned noise but decreases the aperture time of the circuit significantly. Switching is accomplished by current steering in which current sources are selectively applied to an amplification stage which functions as a buffer, a switch and as an isolation stage. When the current sources are not applied to the amplification stage they are applied to a current sink, thereby eliminating current transients which would slow up the circuit. For the purposes of this invention a current source is a circuit element having two terminals in which the current at the terminals is independent of the voltage between the terminals. It will be appreciated that current sources, sometimes called current generators, are well known in the art.

Switching by controlling the operation of a conventional transistor amplification stage decreases the aperture time associated with field effect transistors by as much as an order of magnitude. Since the amplifiers employed in the subject circuit utilize silicon junctions, very little storage capacitor current is leaked through the subject circuit during the holding operation since the only discharge current is the base current of the transistors. This base current can be made quite small with the use of "Super $\beta$" transistors.

It will be appreciated that the actual charging time for capacitors utilized in the subject circuit is no greater than 50 nanoseconds. The aperture time of the subject device is on the order of 1 nanosecond such that the actual holding time of the circuit can be designed to be less than 1 microsecond. With the subject sample and hold circuit it is possible to do an eight-bit analog to digital conversion including a synchronization bit in less than a microsecond. This is a twentyfold improvement over state of the art analog to digital converters which can perform the above conversion in no less than 18 to 20 microseconds.

SUMMARY OF THE INVENTION

It is therefore an object of this invention to provide an improved sample and hold circuit in which the switching function of the circuit is accomplished by amplifiers which are activated and placed on standby by the switching of current sources thereto.

It is another object of this invention to provide a sample and hold circuit having improved noise characteristics and improved aperture times which enable analog to digital conversion in less than 1 microsecond in an eight-bit system.

It is a further object of this invention to provide an improved sample and hold circuit in which storage capacitor leakage through the sample and hold circuit is minimized.

It is a still further object of this invention to provide an improved sample and hold circuit including transistor amplification stages in which saturation is prevented during extreme analog voltage input swings.

It is a still further object of this invention to increase the ratio of the holding time with respect to the aperture time such that the effects of switching from a sampling mode to a holding mode and vice versa, are substantially eliminated and such that the sample and hold circuit can be provided with an arbitrarily long or short holding time commensurate with the analog to digital conversion system utilized.

It is yet another object of this invention to provide a sample and hold circuit having a current-switched amplification stage with a current sink from which the current is drawn when it is not drawn from the amplification stage.

It is yet another object of this invention to provide a method for preventing the capacitor used in a sample and hold circuit from leaking back through this circuit during a holding period.

These and other objects and features of this invention will become more fully apparent from the following description of the accompanying drawings.

BRIEF DESCRIPTION OF THE INVENTION

A sample and hold circuit is provided with an amplification stage which is rendered active or placed in a standby condition by current steering circuitry. The current steering circuit is provided with a current sink to eliminate current transients. The transistors in the amplification stage have silicon junctions and are connected such that the only leakage current through the switching circuit is the base current of a "Super $\beta$" transistor. The base current of this transistor can be made quite small by making the gain of this transistor large. Current steering provides the sample and hold circuit with nanosecond aperture times such that the holding time of the circuit may be reduced to less than 50 nanoseconds. A compensation circuit is also provided to prevent saturation of the amplification stage when the sample and hold circuit is overdriven by a change in the analog signal from one extreme to another. Elimination of saturation eliminates the long recovery time associated therewith.

DETAILED DESCRIPTION OF THE INVENTION

Figure 1:
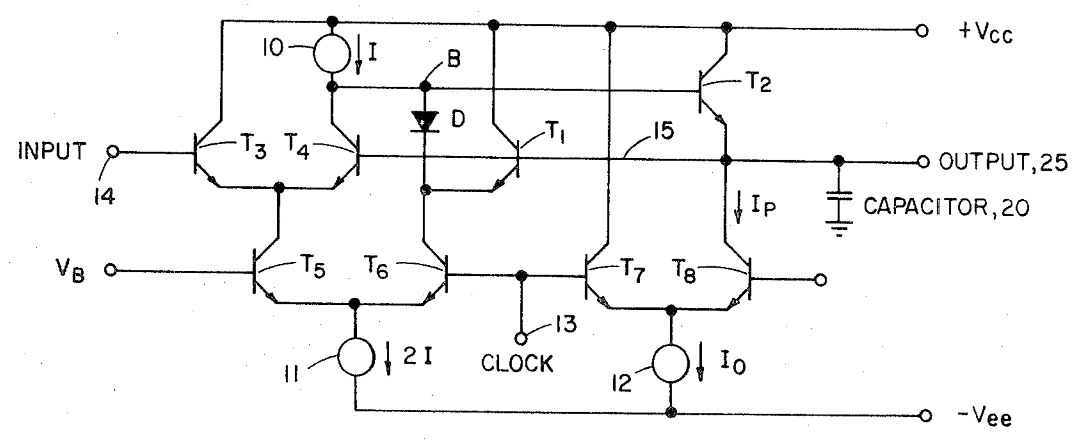
FIG. 1 is a circuit diagram of the basic sample and hold circuit which comprises the subject invention.

The basic sample and hold circuit is shown in FIG. 1. From a functional point of view the circuit is comprised of an amplification section, a signal storage section and a current-steering section. Analog information is fed to the input of the amplification section, which, during the sampling period transmits the analog information unaltered to the signal storage section. During the sampling period the current-steering section supplies current to the amplification section rendering it operative. During the holding period the current-steering section shifts the current which would normally be flowing in the amplification section to a current sink during the time that the amplification section is shut down. This prevents the formation of current transients which would degrade the signal to the signal storage section. The current steering section utilizes several current sources and shifts these sources between the amplification section and the current sink.

In FIG. 1 the amplification section is composed of an operational amplifier which includes a differential pair of transistors $T_3$ and $T_4$ and a feedback circuit 15. The output of the operational amplifier is coupled to an isolation stage which is composed of a switching transistor $T_2$ which serves to interrupt signals to the signal storage stage and to interrupt the feedback circuit to the operational amplifier during the holding period. For purposes of this invention the isolation stage is considered to be part of the amplification stage, since it contains a transistor amplifier. Current source 10 is also part of the amplification stage and is connected between the output transistor of the aforementioned differential pair and a reference potential $V_{cc}$. The purpose of this current source is to provide a reference current at all times to the operational amplifier. This reference current provides for a constant high feedback loop gain and confines current-steering to the emitter side of the amplifier. Current switching could be accomplished at the collector side but integrated PNP-switches are not yet available which can adequately handle the switching speeds required. The current-steering section is composed of two differential emitter coupled pairs of transistors $T_5$–$T_6$ and $T_7$–$T_8$, a current sink composed of diode D and transistor $T_1$, and current sources 11 and 12 which are shifted to the amplification section only during the sampling period. As mentioned hereinbefore there are several current sources. There is a current source between the collector of transistor $T_4$ and collector supply $+V_{cc}$. This is labeled as current source 10 and provides a current equal to "I" as shown. A second current source is shown providing current for differential pair $T_5$ and $T_6$. This current source is shown at 11 and provides for current "2I" through either $T_5$, $T_3$ and $T_4$ or $T_6$, D and $T_1$. The third current source shown at 12 provides a current "$I_0$" through the differential pair $T_7$–$T_8$. The differential pairs $T_5$–$T_6$ and $T_7$–$T_8$ have one side connected to a bias voltage which is fixed and shown as $V_B$. These differential pairs have their emitters interconnected and the base of $T_6$ is coupled to the base of $T_7$. It is to these bases that a clock pulse is applied as shown at 13. The input to this sample and hold circuit is shown at 14 to be coupled to the base of transistor $T_3$. The output of transistor $T_4$ is tapped from the collector and supplied to isolation transistor $T_2$ at the base thereof. The feedback loop is established from the emitter of $T_2$ to the bases of $T_1$ and $T_4$, as shown by line 15. Isolation transistor, $T_2$, develops an output at its emitter which is supplied to capacitor 20 which stores the analog information during the holding portion of the sample and hold cycle and which is charged during the sampling period. The output is obtained from the ungrounded end of capacitor 20 and is labeled 25. A point, B, is shown connected to one end of current source 10. This point will be referred to in connection with the holding period, since in the holding mode, transistor $T_4$ is turned OFF.

Considering now the sampling mode of the circuit shown in FIG. 1, initially the clock shown at 13, will be at a low value such that this value is significantly lower than bias voltage $V_B$. This insures that transistor $T_5$ and transistor $T_8$ are conductive and that transistors $T_6$ and $T_7$ are nonconducting or OFF. In this case transistor $T_5$ carries a current equal to 2I and $T_8$ carries a current equal to $I_0$ such that the current from the emitter of isolation transistor $T_2$ to the collector of transistor $T_8$ is $I_p$ which in this case is equal to $I_0$. Since transistor $T_6$ is OFF, the current sink composed of the diode labeled D in FIG. 1 and transistor $T_1$ has no current diverted to it. For the purposes of explanation, these two components can be said to be OFF and may be ignored. The circuit shown in FIG. 1 thus reduces to the circuit shown in FIG. 2 in which line 26 represents a unity feedback circuit to transistor $T_4$. Current sources 11 and 12 are shown but transistors $T_5$ and $T_8$ are omitted. In the interest of simplicity, in the sampling mode the input is directly coupled to the output and across capacitor 20. As such, the subject circuit may be recognized as an amplifier with a unity feedback such that $V_{out}/V_{in}=1$. This amplifier, shown as operational amplifier 30 in FIG. 3, has a positive input and a feedback circuit, 31, connected to a negative input at the amplifier. Since $V_{out}=V_{in}$, capacitor 20 is correspondingly charged by the analog signal delivered to the input. The current-carrying capacity of transistor $T_2$ and the value of current $I_0$ are chosen such that ample current is always available to drive capacitor 20. As mentioned hereinbefore, the subject circuit has aperture times on the order of a nanosecond such that there is no significant lag between $V_{out}$ and $V_{in}$ with the clock pulse low. Therefore in the sampling mode the amplifier operates to supply $V_{in}$ directly to the capacitor.

Considering now that clock 13 is high and significantly higher than bias voltage, $V_B$, it will be appreciated that transistors $T_6$ and $T_7$ are conductive and transistors $T_5$ and $T_8$ are rendered nonconductive or turned OFF. In this case transistor $T_6$ carries a current equal to 2I and transistor $T_7$ carries a current equal to $I_0$. Since transistor $T_5$ is turned OFF, transistors $T_3$ and $T_4$ have no current so they are both in an OFF condition for purposes of this analysis and may be ignored.

In the high clock mode or the holding mode the equivalent circuit is shown in out–4. In this case transistor $T_2$ is turned OFF and point B is supplied with a voltage equal to $V_{out}$. Current source 12 is shown in this diagram because in the clock high mode $I_0$ current will flow between $V_{cc}$ and $-V_{ee}$. By virtue of current sources 10 and 11 equal to I and 2I, diode D and transistor $T_1$ must both be in conductive states. It will be appreciated that the emitter of transistor $T_1$ is at a potential of $V_{out}-\phi\phi$ is the emitter-base voltage drop of transistor $T_1$. Thus point B on the base of transistor $T_2$ must be at a potential of $V_{out}$. Since the base and emitter of transistor $T_2$ are at the same potential, transistor $T_2$ is turned OFF. Thus $V_{out}$ contained on capacitor 20 just prior to the clock going high is stored and held in the capacitor with the only discharge current being the base current of transistor $T_1$. This base current is shown as $i_b$. As will be seen hereinafter, this base current can be made insignificant such that the current sink circuit has no significant effect on the information stored in capacitor 20. When the clock pulse is high therefore the capacitor 20 stores a potential which was developed during the sampling. Thus, when the clock pulse is high the device is said to be in its holding mode.

It should be noted that the above circuit functions as a conventional sample and hold circuit but it is not limited by the slow speeds of mechanical switches and field effect transistors used in prior art devices. The operation of the circuit is characterized by current steering such that point B is the only node that moves significantly. It will be appreciated that the node moves from $V_{out}+\phi$ to $V_{out}$, and that this movement has a net value of $\phi$ which is quite small. Thus switching to the holding mode can be accomplished in nanosecond times.

It will be further appreciated that if the analog signal applied to input 14 of FIG. 1 is shifted from one extreme value to another it is possible that transistor $T_4$ will saturate. This is undesirable since a saturated device has a long recovery time in order to get back into the active region once overdrive is removed. Saturation of transistor $T_4$ would destroy the speed of the circuit for sample and hold use and must be compensated for in some fashion.

Saturation comes about under the following condition. Consider that a sample of $V_{in}$ was taken and is being held on the capacitor. Assume further that its value, $V_{out}$=+3v. Suppose that during the time that $V_{out}$ equals +3v. (i.e., during the holding period), $V_{in}$ has moved to some new value as for instance $V_{in}$=−3v. If the clock now moves from a high value to a low value initiating sampling, the output $V_{out}$ would have to shift from +3v. to −3v. This cannot be done instantaneously because it takes a finite time to charge or discharge the capacitor. With the conditions such that $V_{in}$=−3v. and $V_{out}$=+3v., $T_3$ would be OFF, and $T_4$ would be conductive. $T_5$ would also be conductive, conducting a current 2I by virtue of the clock low. Since the collector load current of transistor $T_4$ is I, established by current source 10, and the emitter current of transistor $T_4$ is 2I since transistor $T_3$ is OFF, there is a current imbalance through transistor $T_4$ and transistor $T_4$ must saturate.

In order to prevent saturation, the basic circuit shown in FIG. 1 is modified by changing current source 10 from I to 3I and adding an additional current source 40 having a value of 2I. The collector of transistor $T_6$ is now tied to point B instead of to the emitter of transistor $T_1$ and diode D, as shown in FIG. 5.

Figure 5:
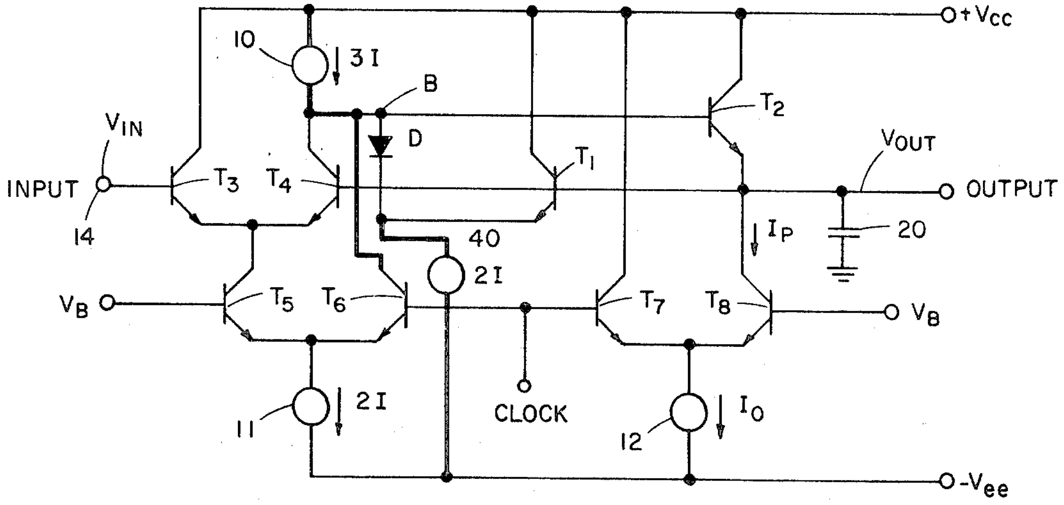
FIG. 5 is a schematic diagram of a modification of the circuit shown in FIG. 1, in which saturation of the amplification section is prevented by the addition of an additional current source.
Figure 6:
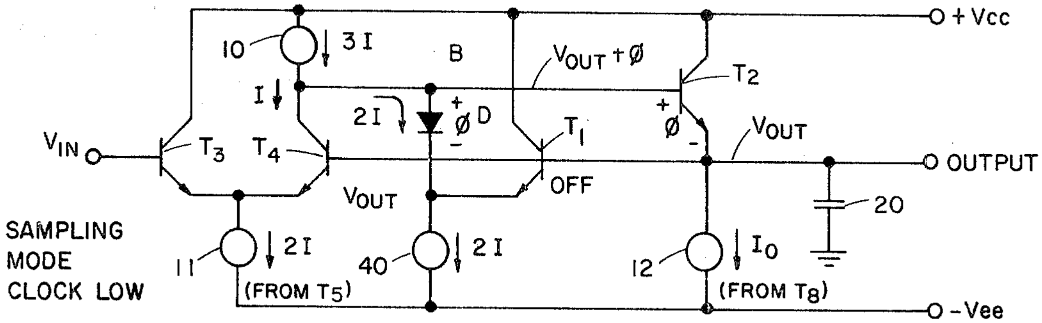
FIG. 6 is that portion of the circuit shown in FIG. 5 which is operative during the sampling mode.

The normal sampling mode of the circuit shown in FIG. 5, is shown in FIG. 6. "Normal" sampling means that $V_{in}$ is not so different from $V_{out}$ that transistor $T_3$ is turned OFF and transistor $T_4$ is saturated. With the clock pulse low, current source 11 is at a value of 2I, current source 12 is at a value of $I_0$ and current source 40 maintains its 2I current. Current source 10, which is now at a 3I level is shared such that current I is passing through transistor $T_4$ and 2I of this current is flowing through the diode D. In the normal sampling mode, it will be appreciated that transistor $T_1$ is OFF, but diode D now conducts in this mode. The collector current of transistor $T_4$ is still I as in the original sampling mode schematic since transistor $T_3$ is conducting current I, and has not been turned OFF by an abnormally low analog voltage at the input. Thus $V_{out}$ is still equal to $V_{in}$. It will be appreciated that the voltage at point B is still equal to $V_{out}+\phi$ and that the voltage drop across the diode is $\phi$ such that $V_{out}$ appears both at the emitter of transistor $T_1$ and at its base since the voltage drop across transistor $T_2$ is $\phi$. Transistor $T_1$ is thus turned OFF during a normal sampling period.

Figure 7:
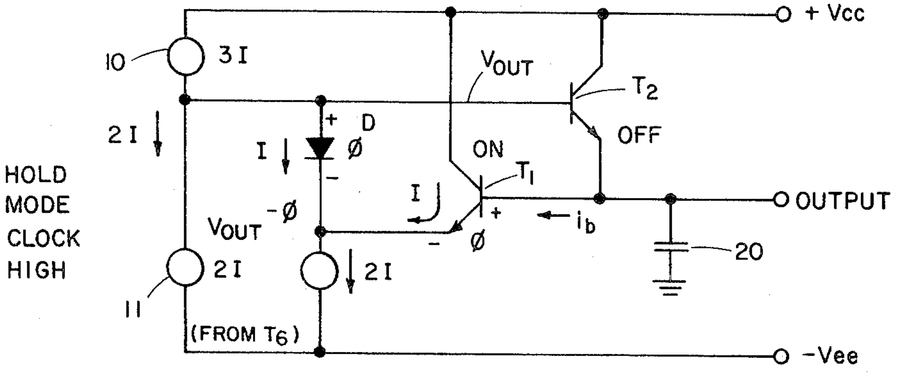
FIG. 7 is that portion of the circuit shown in FIG. 5 which is operative during the holding mode.

FIG. 7 indicates the operation of the circuit in FIG. 5 during the holding mode. It will be appreciated, from this diagram, that transistor $T_3$ and transistor $T_4$ are OFF because transistor $T_6$ is conducting and transistor $T_5$ is turned OFF with the high clock pulse. It will further be appreciated that transistor $T_2$ has voltage $V_{out}$ applied to both its base and emitter turning it OFF. At this time, however, transistor $T_1$ is turned ON since the voltage at the base of transistor $T_1$ is $V_{out}$ (from capacitor 20) and the emitter of transistor $T_1$ is $V_{out}-\phi$. This occurs because the voltage drop across diode D is $\phi$. It will be appreciated that the 3I current is shared between diode D and transistor $T_6$, such that 2I flows through $T_6$ and I flows through diode D. Since transistor $T_1$ is turned ON, I also flows through this transistor to satisfy the 2I of current source 40.

Figure 8:
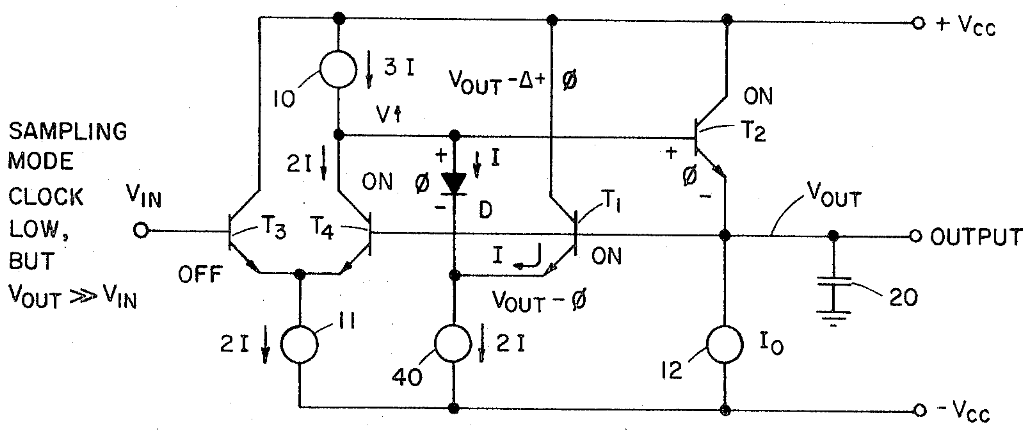
FIG. 8 is a schematic diagram of the operative portion of the circuit shown in FIG. 5 showing a sampling mode in which the output voltage is very much greater than the input voltage, a condition which would result in saturation of the input circuit shown in FIG. 1.

Referring to FIG. 8 a situation is shown in which the sample and hold circuit is in its sampling mode and in which the signal at the input to the sample and hold circuit is very much less than the signal already stored in the output circuit on capacitor 20. This occurs when a high value of the analog signal was supplied at the input to the circuit during the previous sampling and holding cycle. This high value is consequently held in capacitor 20. If, at the beginning of the next sampling period the analog signal delivered to the base of transistor $T_3$ is very much lower than the signal stored in capacitor 20, then the base of transistor $T_3$ will be very much lower than the voltage applied to the base of transistor $T_4$ by capacitor 20. This results in $T_3$ being rendered nonconductive and $T_4$ being rendered conductive.

Figure 2:
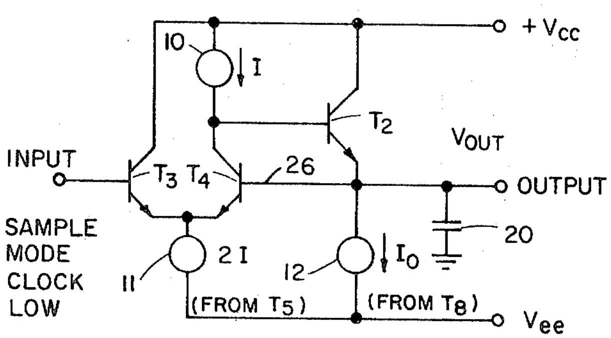
FIG. 2 is a schematic diagram of that portion of the circuit of FIG. 1 operating in the sampling mode.
Figure 3:
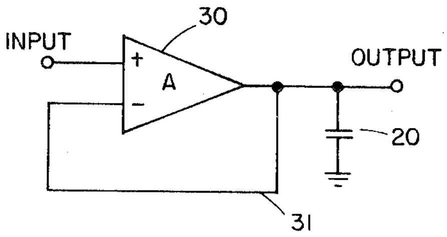
FIG. 3 is a block diagram of the circuit shown in FIG. 2.
Figure 4:
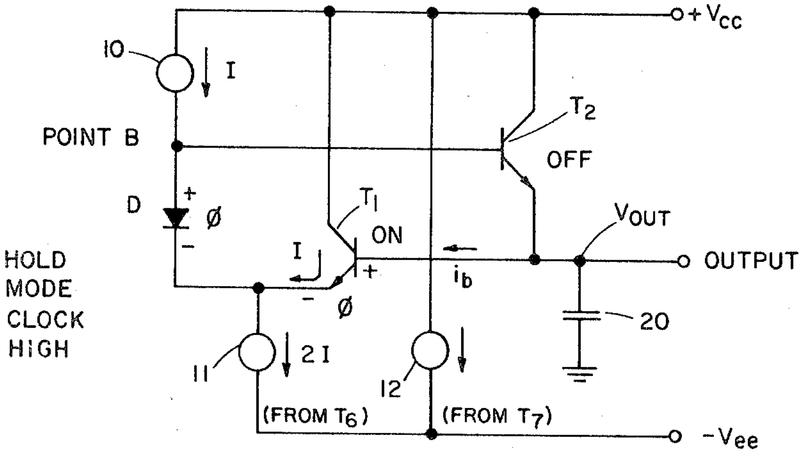
FIG. 4 is a schematic diagram of that portion of the circuit shown in FIG. 1 which is operative during the holding mode.

Referring for the moment to FIG. 2, which shows a circuit not having the saturation compensation circuit shown in FIG. 8, this $V_{out}-V_{in}$ difference would result in $T_4$ carrying all the current. However, current source 11 demands that 2I be drawn through transistor $T_4$ and current source 10 can only deliver the current I. There exists therefore a current imbalance across transistor $T_4$ driving it negative and into the saturation region.

Saturation of the differential pair, due to the condition in which the input voltage is very much less than the voltage stored in capacitor 20, is alleviated by the circuit shown in FIG. 8 in the following manner. Here, also, transistor $T_3$ will be rendered nonconductive when the differential voltage between the bases of transistor $T_3$ and $T_4$ exceeds the predetermined value. $T_4$ will be turned ON and will be conducting a current 2I with current source 10 now equal to 3I. The other I portion is conducted through diode D to current source 2I. However, in the normal sampling mode transistor $T_1$ is turned OFF. It is therefore necessary to turn transistor $T_1$ ON to supply an additional I current to satisfy current source 40. Transistor $T_1$ is turned on because $V_{in}$ is very much less than $V_{out}$.

Reviewing, for a moment, the normal sampling mode, the voltage at collector $T_4$, which is delivered to the base of transistor $T_2$, is $V_{out}+\phi$. Since transistor $T_2$ drops this $V_{out}+\phi$ voltage by an amount $\phi$, $V_{out}$ is applied to the base of transistor $T_1$. It will be appreciated that the voltage drop across diode D is also $\phi$ such that the voltage at the emitter of transistor $T_1$ during normal sampling is $V_{out}-\phi$; but the voltage at the top of diode D is $V_{out}+\phi$ so the voltage at the emitter of transistor $T_1$ during normal sampling is $V_{out}$. Since the voltage at the emitter and base of transistor $T_1$ are equal in the normal sampling mode, transistor $T_1$ is turned OFF.

However, if $V_{in}$ is very much less than $V_{out}$ the base of transistor $T_1$ will be at a $V_{out}$ level while the emitter of transistor $T_1$ will be at some value less than $V_{out}$. This occurs as follows. Assuming that the analog voltage available at transistor $T_3$ is very much less than $V_{out}$, the voltage at the emitter of transistor $T_1$ will equal $V_{out}+\phi-\Delta$, where $\Delta$ is greater than $\phi$. ($\Delta$ corresponds to the decrease in $V_{in}$). Since the emitter voltage is then derived from that available to diode D, the emitter voltage is less than the base voltage on $T_1$, by an amount $(\phi-\Delta)$, $T_1$ is thus turned ON and can supply the additional I current to satisfy current source 40.

It will be appreciated that the voltage at the top of diode D, as it decreases from a point $V_{out}+\phi$ to $V_{out}+\phi-\Delta$, partially cuts out the current-carrying capability of diode D. Thus, the diode cannot, in actuality, carry I current. The additional current is drawn through $T_1$ which drives the voltage at the collector of $T_4$ positive. This positive swing is the result of the current delivered to this node being 3I and the current being drawn from it being something less than 3I. The voltage at the collector of transistor $T_4$ thus rises until it is equal to $V_{out}+\phi$ and the circuit is restored to its normal sampling operation without saturation of transistor $T_4$. It will be appreciated that during the time that diode D cannot transmit the full I current, $T_1$ picks up and passes this additional current thus driving the voltage at the collector of $T_4$ upwardly until the $-\Delta$ component is removed.

It will thus be appreciated that $T_1$ is turned ON in the sampling mode only when $V_{out}$ is very much greater than $V_{in}$. It is not turned ON when $V_{out}$ and $V_{in}$ do not differ by the operating extremes of the circuit. Thus, when saturation is about to occur $T_1$ is turned ON to satisfy current source 40, leaving 2I current at the collector of transistor $T_4$ to match the current demanded by current source 11.

Figure 9:
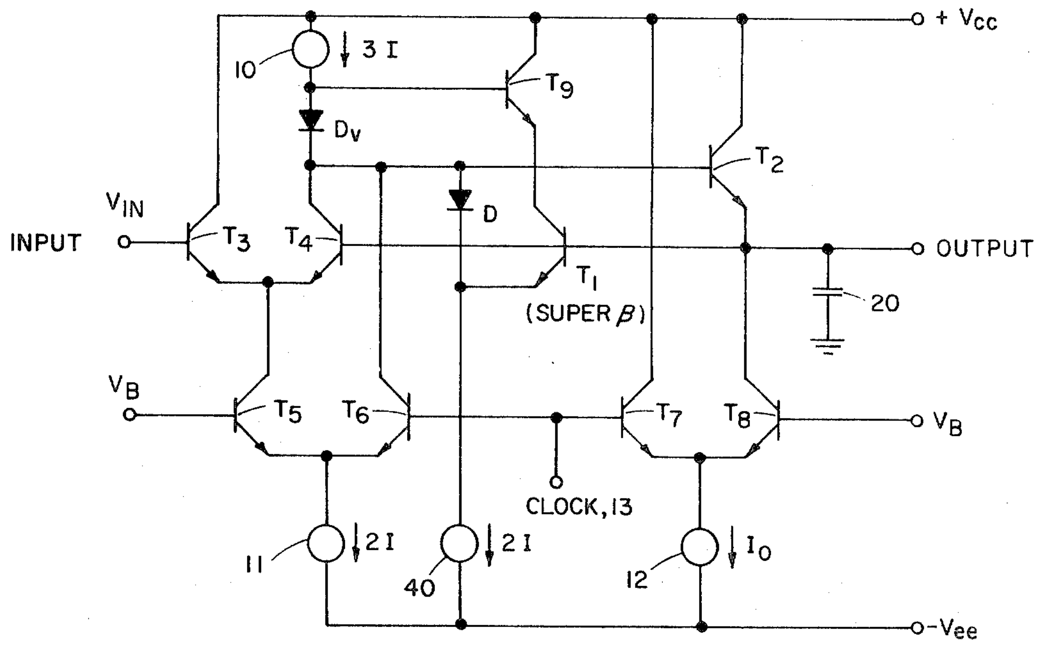
FIG. 9 is a schematic diagram of the final embodiment of the sample and hold circuit incorporating a low leakage circuit and the saturation compensation circuit shown in the preceding figures.

As described hereinbefore, the subject circuit provides only a very small leakage path for the current in capacitor 20 during the holding portion of the sample and hold cycle. Thus the only leakage path is the base current of transistor $T_1$. Since it is desirable to reduce this base current as much as possible during holding time, transistor $T_1$ is made in such a manner that its gain exceeds 2,000. Typically transistors with $\beta$=2,000 −10,000 are fabricated by increasing the depth of the emitter region such that in NPN-structures there is very little P-region between the collector and emitter regions. This particular transistor, because of its high gain, is said to be a "superbeta" transistor. However, "superbeta" type transistors have a low breakdown voltage and must have their collectors supplied from a potential not much higher than their bases. As shown in FIG. 9, the collector potential for transistor $T_1$ is thus provided by an additional transistor $T_9$, having its collector connected to collector supply $V_{cc}$ and its emitter coupled to the collector of transistor $T_1$ with the base of transistor $T_9$ coupled to the bottom of current source 10 to which is also coupled a further diode $D_F$. It will be appreciated that diode $D_F$ provides a voltage drop from the base of transistor $T_9$ to the top of diode D, thence to the emitter of $T_1$. Thus the voltage available at the base of transistor $T_9$ controls the voltage available to the collector of $T_1$ such that the voltage from the collector of $T_1$ to the emitter of $T_1$ is only about one diode drop $\phi$, thus preventing breakdown.

What is claimed is:

1. A circuit for coupling an analog input signal to a signal storage means during one portion of a sample and hold operation and for isolating said storage means from further input signals and from signal leakage back through said circuit during a different portion of said sample and hold operation, comprising:

amplifying means coupled between said input signal and said signal storage means, said amplifying means functioning as an amplifier having a gain of "1" during the sampling portion of said operation such that said input signal is coupled unaltered to said signal storage means during said sampling portion, said amplifying means functioning to isolate said storage means from further input when said amplifying means is rendered inoperative during the holding portion of said operation;

current-steering means coupled to said amplifying means for activating it during sampling portions of said sample and hold operation, said amplifying means including a first current source for supplying current thereto, said current-steering means including first means for absorbing during the holding portion of said sample and hold operation all of the current generated by said first current source whereby the current not absorbed by said amplifying means when said amplifying means is inoperative is absorbed such that current transients through said amplifying means during a mode change of said circuit are eliminated; and an output means connected between the output of said amplifying means to an input thereof, said output means including a feedback loop for preserving the gain of said amplifying means at one, said output means coupling the output of said amplifying means to said signal storage means during said sampling portion, said output means being interrupted during said holding portion, such that all the current normally drawn thereby is absorbed by said current steering means, said current-steering means including second means for absorbing during said holding portion all of the current normally drawn by said output means during said sampling portion due to said amplifying means being operative, whereby current transients are eliminated from said feedback loop during a mode change of said circuit.

2. The circuit as recited in claim 1 wherein said first and second means for absorbing certain amounts of current include current sources so polarized as to draw the current drawn by said amplifying means and said feedback loop around said amplifier means and said feedback loop during said holding portion and wherein said amplifier means includes:

an operational amplifier having a first differential pair of transistors, said current-steering means including a second differential pair of transistors, one transistor in said second differential pair being rendered conductive during said sampling portion and being connected to said operational amplifier so as to draw current therefrom for rendering said operational amplifier operative and the other transistor in said second holding portion and being connected to said first current source so as to draw the current generated by said first current source from said first current source during said holding portion, the transistors in said second pair being rendered nonconducting during mutually exclusive time periods such that current is drawn exclusively either through said amplifier means or said other transistor in said second differential pair.

3. The circuit as recited in claim 2 wherein said first differential pair draws a current equal to 2I whenever said first differential pair is rendered operative such that a current, I, is drawn by each transistor in said first pair, and wherein said first current source generates a current, I, and is connected to one of the transistors in said first pair such that 2I current is drawn through the differential pair in said amplifying means whenever it is rendered operative by said current steering means and such that 2I current is drawn through said second transistor in said second differential pair whenever said amplifying means is rendered inoperative, I of said current being made up by said feedback loop whenever said amplifier means is rendered inoperative by said current-steering means.

4. In a circuit comprising a differential pair of transistors having interconnected emitters coupled to a first current source, one of said transistors having its collector coupled to a second current source which generates a current more than that necessary to satisfy said first source in conjunction with the current drawn by the other of said transistors when both of said transistors are biased into conduction, and having their bases connected to an analog signal and a source of potential voltage respectively, means for preventing saturation of that transistor coupled to said source of potential voltage whenever said analog input signal drops to a voltage very much lower than said potential voltage, comprising:

means for equalizing the current supplied to the collector of and drawn from the emitter of the transistor connected to said potential voltage whenever the other transistor in said pair is rendered nonconductive by virtue of the voltage differential between the bases of the transistors in said differential pair being above the predetermined value.

5. The saturation prevention means recited in claim 4 wherein said means for equalizing includes means for drawing that current which is more than that necessary to satisfy said first source plus that which is not drawn through the nonconductive transistor from another portion of said circuit whenever said transistor is nonconductive.

6. The saturation prevention means as recited in claim 5 wherein said means for drawing current includes:

a third current source which generates a current equal to that drawn by first current source, first loading means coupled between said third current source and said second current source, and second loading means coupled to said third current source for drawing therethrough that current not drawn by said nonconducting transistor whenever said transistor is nonconducting whereby the currents generated by said first and third current sources are satisfied by said second current source and by current drawn through said second loading means.

7. In a sample and hold circuit having a storage stage including a capacitor, a method for preventing leakage of said capacitor back through said sample and hold circuit during the holding portion of the sample and hold cycle, comprising:

using transistors having beta characteristics in excess of 2,000 in all circuits in which a base of a transistor is coupled to the ungrounded side of said capacitor; and compensating the voltage applied to the emitters and collectors of said transistors such that the voltage differential therebetween never exceeds that which would cause breakdown in said transistors.

8. A sample and hold circuit for coupling analog input signals to signal storage means during the sampling portion of a sample and hold operation and for isolating said signal storage means from inputs during the holding portion of said operation comprising:

amplifier means having inverting and noninverting inputs and an output circuit, said noninverting input adapted to receive said analog input signal;

an isolation stage coupled between the output circuit of said amplifying means and said signal storage means for connecting said output circuit to said signal storage means during said sampling portion and for disconnecting said output circuit from said signal storage means during said holding portion;

feedback means coupled between the output of said isolation stage and said inverting input for maintaining the gain of said amplifying means equal to one;

a current sink, said sink providing an alternate path for the current passing through said amplifier means whenever said sample and hold circuit is in its holding mode; and current steering means for drawing current alternately from said amplifying means and from said current sink during respective sampling and holding portions, and for drawing current through said isolation stage whenever said sample and hold circuit is in its sampling mode so as to activate said isolation stage, thereby to connect the output circuit of said amplifier means to said signal storage means during said sampling portion.

9. The circuit as recited in claim 8 wherein said amplifier means includes a first differential pair of emitter coupled transistors each drawing a current of I when current is drawn from said amplifying means, and wherein said current sink draws a total of 2I current whenever current is drawn therefrom.

10. The circuit as recited in claim 9 wherein said current sink includes:

a semiconducting device connected to the collector of the output transistor in said first differential pair and which draws a current I when said current-steering means draws current from said current sink; and a high gain transistor having its base coupled to said feedback loop such that said transistor draws a current of I through said current-steering means whenever said circuit is in its holding mode, said high gain transistor drawing only a negligible amount of current from said signal storage means through its base-emitter junction and through said current steering means during said holding mode, whereby leakage current from said signal storage means through said current sink and back through said current-steering means is minimized by said high-gain transistor, said leakage current also being blocked at said isolation stage from being drawn by that portion of said current-steering means coupled thereto.

11. The circuit as recited in claim 10 further including a source of clock pulses and wherein said current steering means includes:

first and second current sources and corresponding second and third differential pair switching means, said first current source being coupled to said second pair and said second current source being coupled to said third pair, each of said second and third differential pair switching means including two transistors;

one transistor in said second differential pair being coupled to said amplifying means and the other transistor in said second differential pair being coupled to said current sink such that current from said first current source is switched first to said amplifying means and then to said current sink in response to the amplitude of a clock pulse delivered to the base of one of the transistors in said second differential pair being at a low level and then a high level with respect to the voltage at the base of the other transistor in said second differential pair;

said third differential pair being coupled to said isolation stage so as to deliver current from said second current source to said isolation stage whenever the amplitude of said clock pulse at the base of one transistor in said third differential pair is at a low level with respect to the voltage delivered to the base of the other transistor in said third differential pair.

12. The circuit as recited in claim 10 wherein said current-steering means includes first and second current sources and second and third differential pairs of transistors, the transistors in each of said second and third differential pairs having interconnected emitters, said first current source being coupled to the interconnected emitters in said second pair and said second current source being coupled to the interconnected emitters in said third pair, the base of a first transistor in each of said second and third pairs adapted to receive a bias voltage and the base of the second transistors in each of said second and third pairs adapted to receive a clock pulse, the collector of the first transistor in said second pair being coupled to the emitters of the transistors in said first differential pair, the collector of the first transistor in said third pair being coupled to said isolation stage such that current is delivered to said amplifier means and said isolation stage when the amplitude of the clock pulse at the bases of said second transistors is below the bias voltage delivered to the bases of said first transistors, the collector of the second transistor in said second pair delivering current to said current sink whenever the amplitude of the clock pulse at the base of said second transistor of said second pair is above the bias voltage at the base of transistor in said first pair.

13. In a sample and hold circuit which couples an analog input signal to a signal storage means during the sampling portion of a sample and hold operation and which isolates said storage means from further input signals and from signal leakage back through said sample and hold circuit during the holding portion of said operation, apparatus for preventing saturation of a preselected transistor element in said sample and hold circuit whenever said analog input signal is low with respect to the signal in said signal storage means to such an extent that it would cause saturation of said preselected transistor element and subsequent lengthening of the aperture time of said sample and hold circuit comprising:

a differential pair of first and second transistors having interconnected emitters, the first transistor in said pair adapted to receive said analog input signal at the base thereof and the second transistor in said pair being said preselected element;

first and second reference potentials, the collector of said first transistor being connected to said first reference potential;

a third transistor having its base coupled to the collector of said second transistor, having its collector connected to said first reference potential and having its emitter coupled to said signal storage means and to the base of said second transistor thereby to form a feedback loop, said third transistor serving to couple the output of said differential pair to said signal storage means during said sampling portion and serving to isolate said signal storage means from further input during said holding portion;

a first current source coupled between said first reference potential and the collector of said second transistor, said first current source generating a current 3I;

a second current source generating a current 2I and coupled between said second reference potential and said interconnected emitters during said sampling period, said second current source being coupled between said first current source and said second reference potential during said holding period;

a two terminal load device coupled at one terminal to said first current source;

a fourth transistor having a collector coupled to said first reference potential and having a base coupled to the emitter of said third transistor;

a third current source coupled between said second reference potential and both the other terminals of said load device and the emitter of said fourth transistor, said third current source generating a 2I current and serving to equalize the current across said second transistor; and a fourth current source coupled between said second reference potential and the emitter of said third transistor during said sampling portion thereby to draw sufficient current through said third transistor to insure the proper operation of said signal storage device, whereby saturation of said preselected element is prevented by the generation of equal currents at the emitter and collector thereof when said fourth transistor is biased in such a manner by the voltages available at the base and emitter thereof such that no current is drawn therethrough during a sampling portion in which the voltage of said analog input signal is less than the voltage stored in said signal storage means by no more than that which would cause said first transistor to turn off, such that a current I is drawn therethrough during said holding portion, and such that a current I is drawn therethrough during a sampling period in which said voltage of said analog input signal is less than the voltage stored in said signal storage means by more than that which would cause said transistor to turn off, said load device drawing a 2I current when said fourth transistor conducts no current and a current equal to I at all other times.

14. The apparatus as recited in claim 13 wherein said fourth transistor has a $\beta$ exceeding 2,000 and further including means for maintaining the voltage differential between the emitter and collector thereof at a level which prevents breakdown in said device, whereby current leakage from said signal storage means through said sample and hold circuit is minimized.

* * * * *